C. LEMALE.
SELF PROPELLING TORPEDO.
APPLICATION FILED DEC. 30, 1912.

1,078,687.

Patented Nov. 18, 1913.

3 SHEETS—SHEET 1.

Witnesses.

Inventor.

C. LEMALE.
SELF PROPELLING TORPEDO.
APPLICATION FILED DEC. 30, 1912.

1,078,687.

Patented Nov. 18, 1913.
3 SHEETS—SHEET 2.

C. LEMALE.
SELF PROPELLING TORPEDO.
APPLICATION FILED DEC. 30, 1912.
1,078,687.
Patented Nov. 18, 1913.
3 SHEETS—SHEET 3.
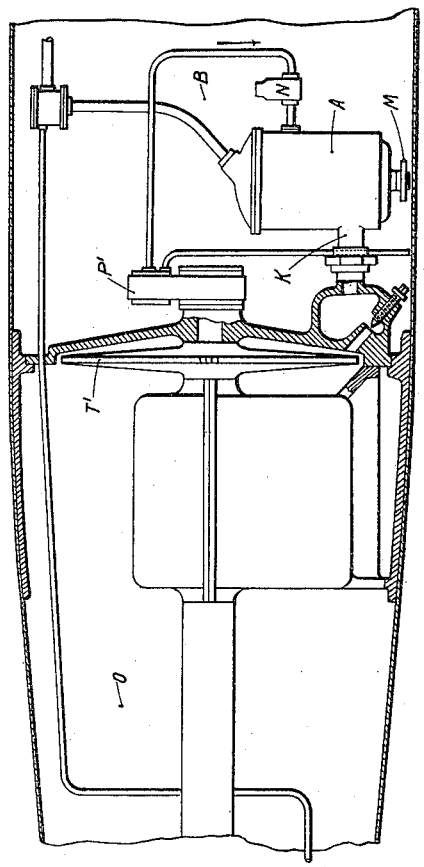
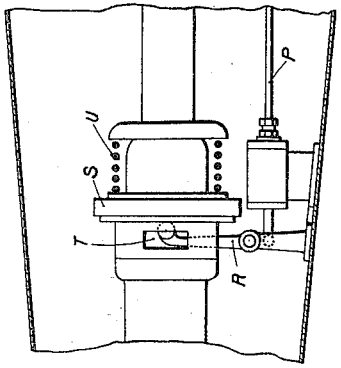

UNITED STATES PATENT OFFICE.

CHARLES LEMALE, OF PARIS, FRANCE.

SELF-PROPELLING TORPEDO.

1,078,687.  Specification of Letters Patent.  Patented Nov. 18, 1913.

Application filed December 30, 1912. Serial No. 739,305.

*To all whom it may concern:*

Be it known that I, CHARLES LEMALE, a citizen of the French Republic, residing at Paris, Department of Seine, in France, have invented certain new and use Improvements in and Relating to Self-Propelling Torpedoes; and I do hereby declare the following to be a full, clear, and exact description of the invention, such as will enable others skilled in the art to which it appertains to make and use the same.

In order to increase the power and the range of self-propelling torpedoes it is advantageous to drive them by means of gas turbines which give a greater driving power than the reciprocating engines. In torpedoes driven in this manner, the combustion of the gases takes place at very high temperatures in the appropriate generators, and the gases are cooled first by water injection and then by their expansion in the nozzles before attaining the blades. But the quantity of necessary water for this purpose being considerable, the torpedoes carry a water reservoir which takes up a great deal of space.

The present invention relates to means for doing away with this drawback by utilizing sea water which is delivered by a special pump. This water penetrates the generator in the shape of thin sheets which are vaporized and get mixed with the furnace gases. The nozzles distributing the driving fluid to the turbine can be closed or partially closed by means of stop valve spindles in order to reduce the output. To regulate the quantity of water in proportion to the number of working nozzles, a piston is provided in accordance with the invention, for closing a corresponding number of injection water orifices. Furthermore, to avoid that the water should fill all the compartments when the torpedo has reached the end of its course, a device has been provided which closes the gas exhaust orifices as soon as the generator ceases work.

Figure 1:
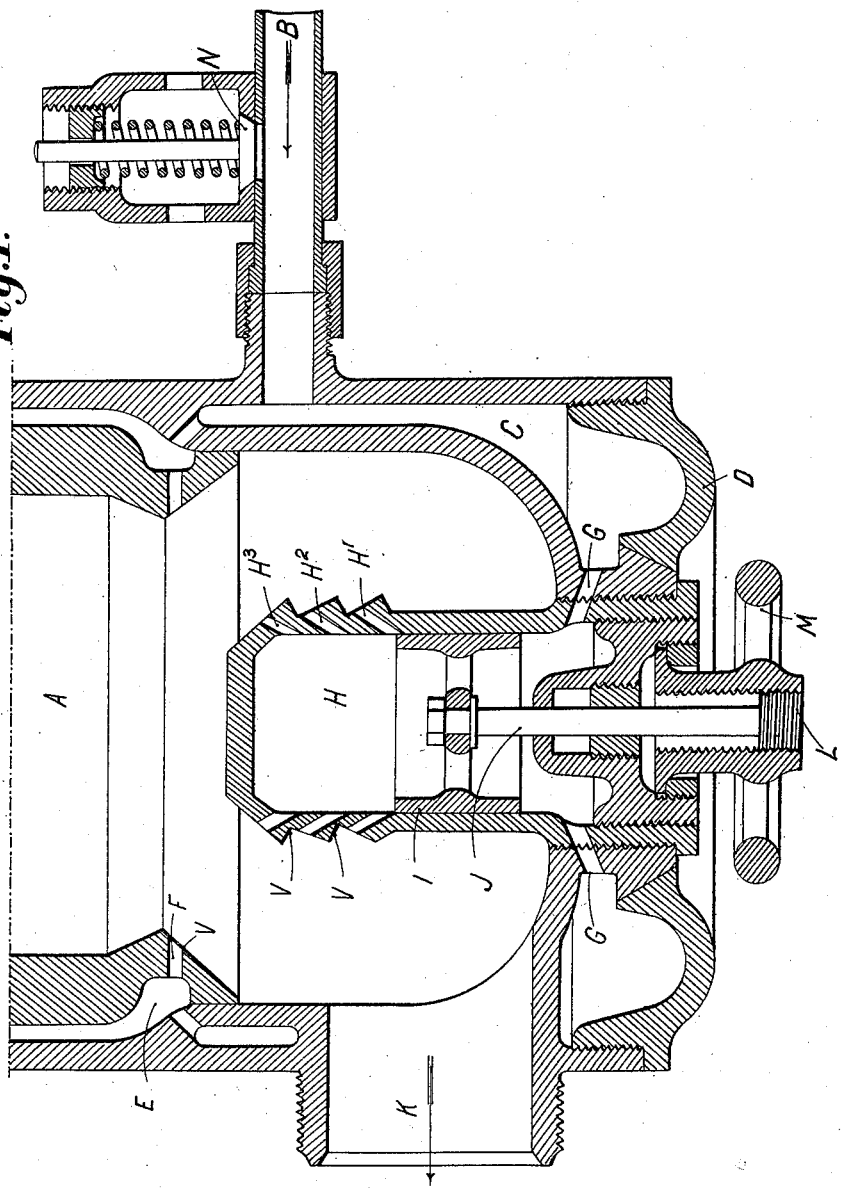
Figure 2:
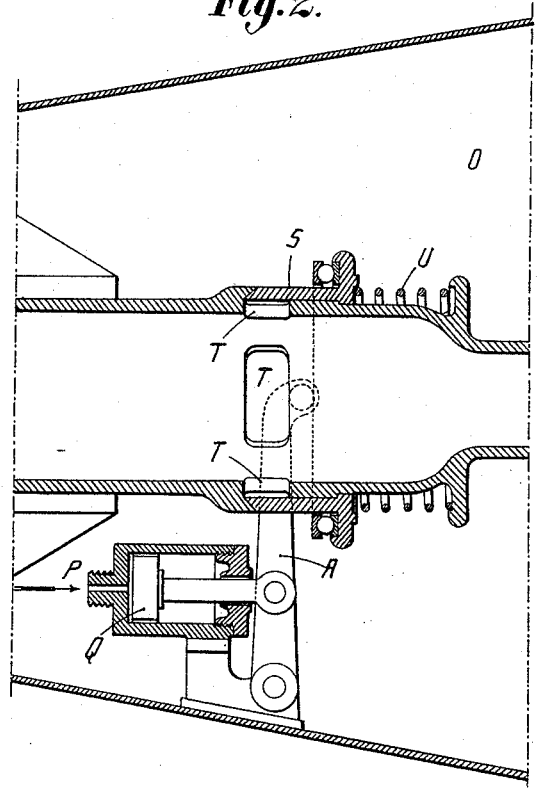

In the accompanying drawing: Figure 1 shows the device for regulating the injection water orifices in the generator. Fig. 2 shows the device for maintaining the torpedo hull watertight. Fig. 3 is a sectional view of a portion of a torpedo showing the complete operating plant.

The combustion of the petrol takes place in appropriate burners situated in the furnace A. Sea water is pumped into the conduit B by means of a pump P'; said conduit leads to the annular chamber C surrounding the lower part of the generator and is provided with an exhaust valve N. The water is heated in this chamber and is thus freed from its impurities which drop down into the annular gutter D wherefrom they can be easily extracted.

Water enters the generator either through orifices E, F or through passages G, the cylindrical chamber H and the orifices $H^1$, $H^2$ and $H^3$ which are arranged in several superposed rows. A certain number of projections V are provided on the exterior of the chamber H and in between the orifices $H^1$ $H^2$ and $H^3$; said projections help the dispersion of the water jets and effect their instantaneous vaporization. The gases leave the generator by a conduit K leading to the turbine nozzles. These equal in number to that of the rows of orifices $H^1$ $H^2$ and $H^3$ or are a multiple of that number.

In order to regulate the admission of water, the cylindrical chamber H has been provided with a piston I, the rod of which has a threaded end L which screws into the hub of the wheel M, said hub being provided with a flange M' or the like, whereby the wheel M is held against axial movements but is permitted to rotate about its axis. It is to be noted that the rotation of the hand-wheel M causes axial movements of the piston rod J.

Supposing that a number of expansion nozzles has been shut off then the volume of the distributed gas is diminished in the proportion of the number of closed to the total number of nozzles. It will suffice, for maintaining constant the temperature of the driving fluid, to reduce the quantity of the injected water in the same proportion. This is effected by means of the piston I, controlled by the wheel M, which closes one or more rows of orifices $H^1$ $H^2$ and $H^3$.

The pump which provides the sea water need not be regulated for any changes in the output of the turbine because the exhaust valve N discharges automatically to the exterior any excess of water.

After having acted upon the blades of the turbine the gases fill the hull and their escape from the hull is controlled by the device shown in Fig. 2. A piston Q works in a cylinder P which is connected in any suitable manner to the distribution of compressed air and acts by means of a forked lever R on the cylindrical valve S fitted on the driving shaft Z of the torpedo. This shaft is hollow so that the gases escape through its interior. The valve S controls the exhaust orifices T and is re-seated by a spring U.

On starting, compressed air is admitted into the cylinder P which forces the piston Q backward and acts upon the valve S so as to open the exhaust orifices.

When the torpedo stops, the compressed air is shut off and the valve S is re-seated by means of the spring U.

I claim:

1. The combination with a generator, of means to admit fluid thereto comprising a chamber projecting into said generator and provided with a series of openings, and means to control the quantity of fluid passing through said openings without changing the velocity thereof.

2. The combination with a torpedo generator, of means to admit water thereto, said means provided with a series of openings through which the water passes to the generator, and means coöperating with said openings to control the quantity of water passing therethrough without changing the velocity thereof.

3. The combination with a generator, of means to admit water thereto comprising a chamber projecting into the generator and provided with a series of openings through which the water flows to said generator, and a valve slidably mounted in said chamber to control said openings.

4. The combination with a generator, of means to admit jets of water thereto, and projections associated with the walls of said generator and located in the path of said jets to diffuse and break up said jets of water.

5. The combination with a generator, of means to admit water thereto, comprising a chamber projecting into the generator, said chamber provided with a series of openings through which the water passes to the generator, said chamber also provided with projections against which the water issuing from said jets impinges.

6. A generator for torpedoes and the like, provided with an opening in one wall thereof through which water is admitted to the generator, a chamber projecting into said generator provided with a series of openings to admit water from said chamber to the generator, and a valve in said chamber to control said openings.

In testimony whereof I affix my signature, in presence of two witnesses.

CHARLES LEMALE.

Witnesses:
HANSON C. COXE,
GEORGES BONJE.

---

Copies of this patent may be obtained for five cents each, by addressing the "Commissioner of Patents, Washington, D. C."